(12) United States Patent
Watanabe et al.

(10) Patent No.: US 10,073,614 B2
(45) Date of Patent: Sep. 11, 2018

(54) INFORMATION PROCESSING DEVICE, IMAGE PROJECTION APPARATUS, AND INFORMATION PROCESSING METHOD

(71) Applicant: KABUSHIKI KAISHA TOSHIBA, Minato-ku, Tokyo (JP)

(72) Inventors: Wataru Watanabe, Kanagawa (JP); Mikiko Karasawa, Tokyo (JP); Yuma Sano, Kanagawa (JP); Masahiro Baba, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/818,424

(22) Filed: Aug. 5, 2015

(65) Prior Publication Data
US 2016/0062406 A1 Mar. 3, 2016

(30) Foreign Application Priority Data
Aug. 28, 2014 (JP) .................................. 2014-174279

(51) Int. Cl.
*G06F 3/0488* (2013.01)
*G06F 3/01* (2006.01)
(Continued)

(52) U.S. Cl.
CPC .......... *G06F 3/04883* (2013.01); *G06F 3/017* (2013.01); *G06F 3/0346* (2013.01);
(Continued)

(58) Field of Classification Search
CPC . G06F 3/031; G06F 3/042; G06F 1/16; G06F 3/0488; G06F 3/0346; G09B 21/00; G09B 21/14; G09G 5/00
See application file for complete search history.

(56) References Cited

U.S. PATENT DOCUMENTS

2006/0267935 A1* 11/2006 Corson ................. G06F 3/0304
345/157
2011/0199312 A1 8/2011 Okuta
2012/0068812 A1* 3/2012 Yamamoto ............... G06K 7/00
340/5.1
(Continued)

FOREIGN PATENT DOCUMENTS

JP 2009-048245 3/2009
JP 2010-154070 7/2010
(Continued)

*Primary Examiner* — Andrew Sasinowski
(74) *Attorney, Agent, or Firm* — Nixon & Vanderhye, P.C.

(57) ABSTRACT

According to an embodiment, an information processing device includes a detector and a controller. The detector detects a pointed position pointed by a pointing object on a projection plane onto which light including information of an input image is projected. When the pointed position belongs to a first region on the projection plane, the controller performs control for executing first processing corresponding to an operation on the first region based on the pointed position. The first region includes a part of a projection image formed by projecting the light onto the projection plane. When the pointed position belongs to a second region on the projection plane, the controller performs control for executing second processing corresponding to an operation on the second region based on the pointed position. The second region includes a smaller part of the projection image than the part of the projection image included in the first region.

17 Claims, 13 Drawing Sheets

(51) Int. Cl.
  *G06F 3/0346* (2013.01)
  *G06F 3/0484* (2013.01)
  *H04N 9/31* (2006.01)
  *G09G 3/00* (2006.01)

(52) U.S. Cl.
  CPC ....... *G06F 3/04845* (2013.01); *H04N 9/3179* (2013.01); *H04N 9/3194* (2013.01); *G06F 2203/04104* (2013.01); *G06F 2203/04808* (2013.01); *G09G 3/002* (2013.01)

(56) References Cited

U.S. PATENT DOCUMENTS

| | | |
|---|---|---|
| 2012/0257244 A1 | 10/2012 | Hara |
| 2012/0313910 A1 | 12/2012 | Haraguchi et al. |
| 2013/0127749 A1 | 5/2013 | Yamamoto et al. |
| 2014/0218300 A1 | 8/2014 | Muraki et al. |
| 2015/0084930 A1 | 3/2015 | Watanabe et al. |
| 2015/0294439 A1 | 10/2015 | Watanabe et al. |

FOREIGN PATENT DOCUMENTS

| | | |
|---|---|---|
| JP | 2010-160403 | 7/2010 |
| JP | 2011-209531 | 10/2011 |
| JP | 2012-65005 | 3/2012 |
| JP | 2012-185631 | 9/2012 |
| JP | 2012-221068 | 11/2012 |
| JP | 2012-238120 | 12/2012 |
| JP | 2012-256000 | 12/2012 |
| JP | 2013-109666 | 6/2013 |
| JP | 2015-64724 | 4/2015 |
| JP | 2015-201064 | 11/2015 |

\* cited by examiner

FIG. 7
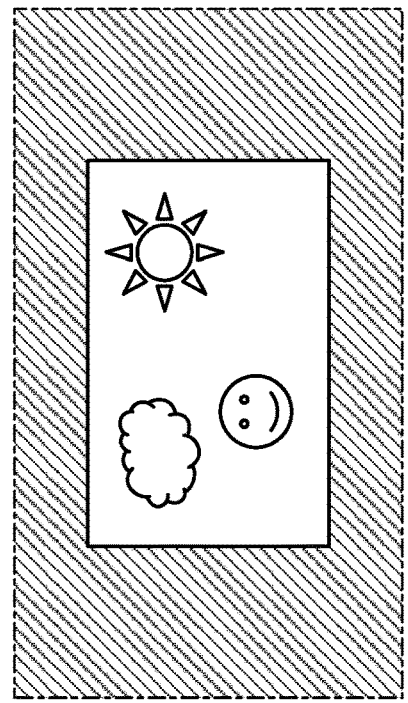
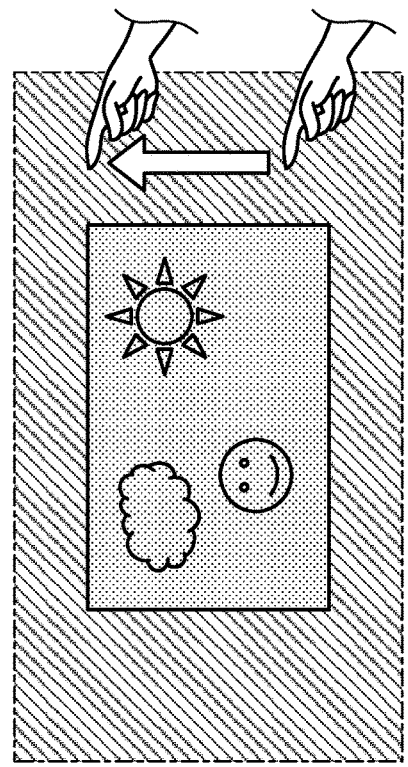

INFORMATION PROCESSING DEVICE, IMAGE PROJECTION APPARATUS, AND INFORMATION PROCESSING METHOD

CROSS-REFERENCE TO RELATED APPLICATIONS

This application is based upon and claims the benefit of priority from Japanese Patent Application No. 2014-174279, filed on Aug. 28, 2014; the entire contents of which are incorporated herein by reference.

FIELD

Embodiments described herein relate generally to an information processing device, an image projection apparatus, and an information processing method.

BACKGROUND

In recent years, there has been developed a technique that combines a projector with a camera or a depth sensor to enable operation on an image (projection image) projected on a projection plane, for example, a wall or a desk top surface. For example, there has been already known a technique that is provided with a camera which captures a range including a projection image on a projection plane and includes a detection region for detecting operation in a region outside the projection image.

However, there has not been conventionally proposed a configuration that includes detection regions arranged both inside and outside a projection image. That is, disadvantageously, conventional techniques are not capable of providing various operation systems to users and, therefore, have low convenience for users.

BRIEF DESCRIPTION OF THE DRAWINGS

FIG. 7 is a diagram illustrating an example of an operation determined by a second processing decider of the first embodiment;

DETAILED DESCRIPTION

According to an embodiment, an information processing device includes a detector and a controller. The detector detects a pointed position pointed by a pointing object on a projection plane onto which light including information of an input image is projected. When the pointed position belongs to a first region on the projection plane, the controller performs control for executing first processing corresponding to an operation on the first region based on the pointed position. The first region indicates a region including a part of a projection image formed by projecting the light including the information of the input image onto the projection plane. When the pointed position belongs to a second region on the projection plane, the controller performs control for executing second processing corresponding to an operation on the second region based on the pointed position. The second region indicates a region including a smaller part of the projection image than the part of the projection image included in the first region.

Hereinbelow, various embodiments will be described in detail with reference to the accompanying drawings.

First Embodiment

Figure 1:
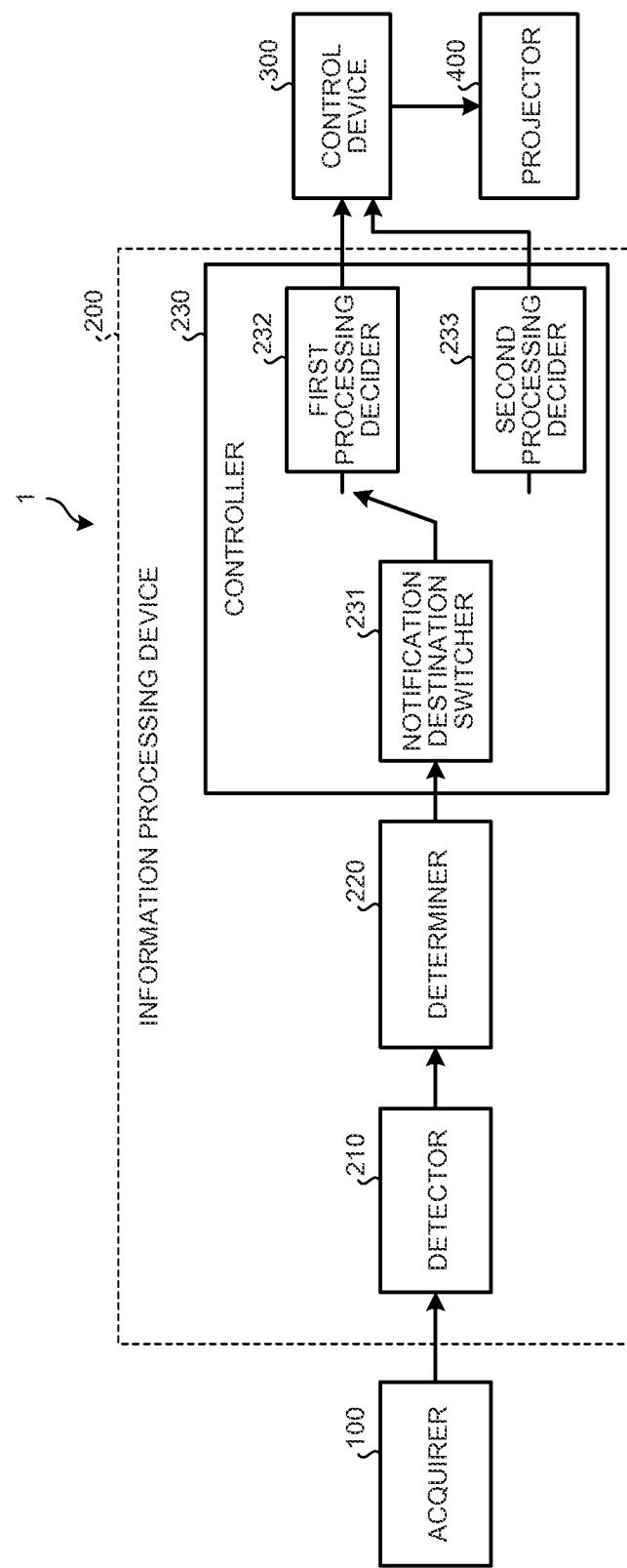
FIG. 1 is a diagram illustrating an example of the configuration of an image projection apparatus of a first embodiment.
Figure 2:
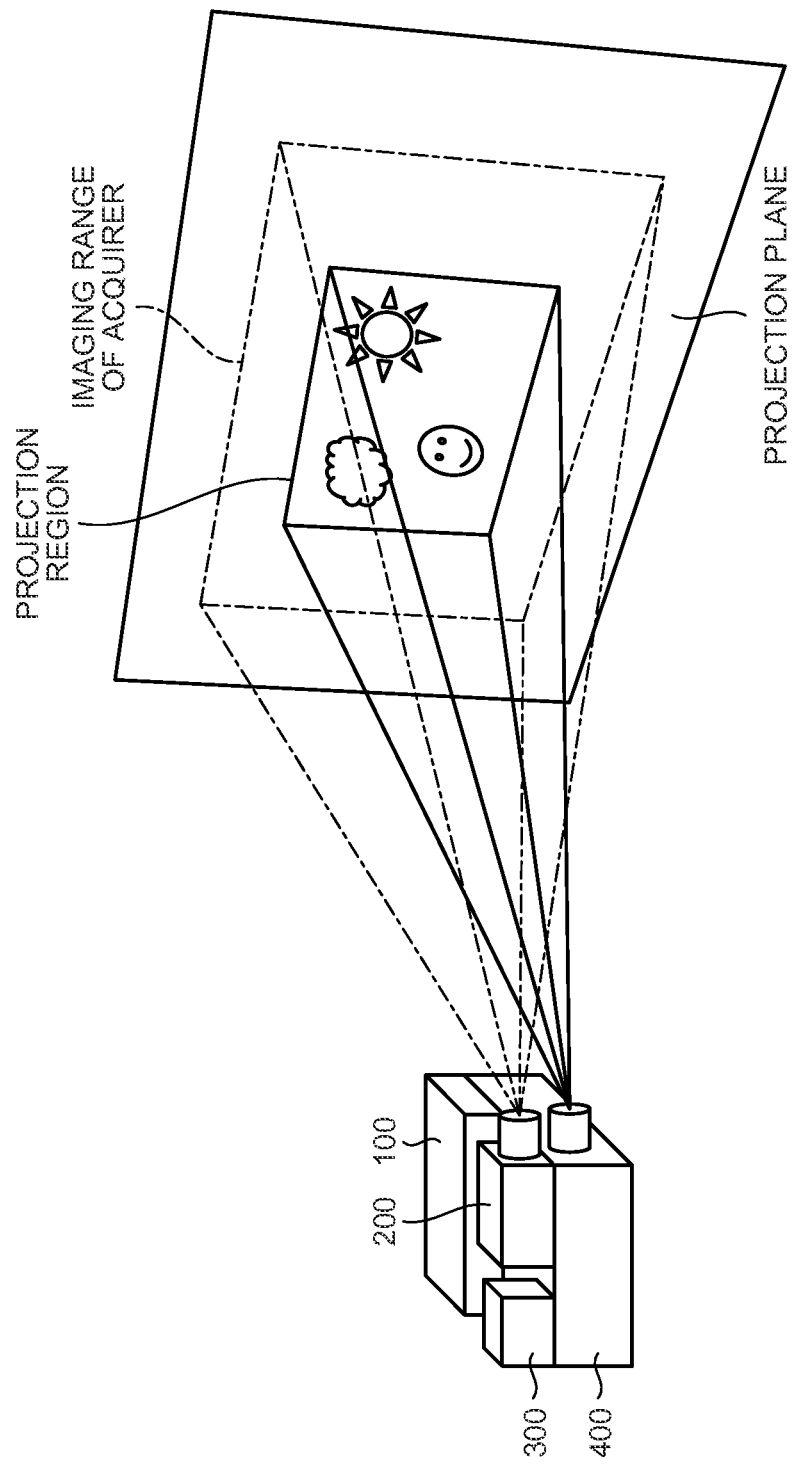
FIG. 2 is a diagram illustrating a state of projection performed by the image projection apparatus of the first embodiment.

FIG. 1 is a diagram illustrating an example of the configuration of an image projection apparatus 1 of a first embodiment. As illustrated in FIG. 1, the image projection apparatus 1 is provided with an acquirer 100, an information processing device 200, a control device 300, and a projector 400. FIG. 2 is a diagram illustrating a state in which the image projection apparatus 1 projects light including information of an input image onto an object (hereinbelow, referred to as "projection plane") that is a target to be projected by the light including information of the input image. In this specification, the projection plane will be described as a flat plane such as a wall and a desk top surface. However, the projection plane is not limited to a flat plane and may, for example, be a plane with asperities. That is, the projection plane is not limited to a flat plane and may, for example, be a curved plane or a plane with asperities. Further, the projection plane may be a region constituted by a plurality of objects. In the following description, a region in the maximum range on the projection plane onto which light including information of an input image can be projected may be referred to as "projection region", and an image formed by projecting light including information of an input image onto a projection plane may be referred to as "projection image".

Referring back to FIG. 1, the acquirer 100 acquires information required for detecting a position pointed by one or more pointing objects on a projection plane. The pointing object may be a hand (finger) of a user or a device such as a pointer. A single pointing object or a plurality of pointing objects may be used. Although the acquirer 100 is composed of a range image sensor which is capable of two-dimensionally acquiring range information from an object in this example, the acquirer 100 is not limited to a range image sensor. The acquirer 100 may be composed of, for example, an ordinary visible light camera as long as it is capable of acquiring information required for detecting a position pointed by a pointing object.

An ordinary visible light camera acquires, as an image, information in which color information components of an imaging object are two-dimensionally arrayed. Similarly, a range image sensor acquires, as a range image, information in which range information components of an imaging object are two-dimensionally arrayed. Examples of a method for acquiring a range image include an infrared pattern irradiation method (a method that applies an infrared pattern, detects the pattern using an infrared camera, and measures the distance by triangulation); and a Time-of-Flight method (a method that applies light onto an object and measures a time required for reciprocation of the light to measure the distance). However, the method for acquiring a range image is not limited to these methods. A sensor that acquires a range image by another method may be employed. In the following description, range information acquired by the acquirer (range image sensor) 100 is represented by d (x, y), where x denotes the coordinate in the horizontal direction of the acquired range image, and y denotes the coordinate in the vertical direction of the acquired range image. As illustrated in FIG. 2, on the projection plane, an imaging range of the acquirer (range image sensor) 100 is set to a range that includes at least a projection region.

Next, the information processing device 200 illustrated in FIG. 1 will be described. As illustrated in FIG. 1, the information processing device 200 is provided with a detector 210, a determiner 220, and a controller 230.

The detector 210 detects a position pointed by a pointing object on the projection plane. In the first embodiment, the detector 210 detects the pointed position using a range image acquired by the acquirer 100. More specifically, the detector 210 detects the position of a pointing object being close to (including touching) the projection plane (corresponding to the position pointed by the pointing object, and, hereinbelow, may be referred to as "touch coordinate") using the range image. For example, the place of the pointing object being close to the projection plane may be determined by the following Equation (1). It can be assumed that the detector 210 detects the position of a pointing object having a distance equal to or less than a threshold from the projection plane as the touch coordinate using the range image.

$$\text{Near}(x, y) \qquad (1)$$
$$\begin{cases} 1 & D_0(x, y) - D_{margin1}(x, y) \leq d(x, y, t) \leq D_0(x, y) - D_{margin2}(x, y) \\ 0 & \text{otherwise} \end{cases}$$

In Equation (1), $D_0$ (x, y) denotes the distance between the acquirer (range image sensor) 100 and the projection plane. Further, $D_{margin1}$ (x, y) and $D_{margin2}$ (x, y) are parameters for detection (determination). In this example, an object being close to the projection plane is present at the position of a pixel that is determined to satisfy Near(x, y)=1 in the range image. For example, a pointing object having a certain level of thickness (width), for example, a finger or a pen comes close to the projection plane, pixels satisfying Near(x, y)=1 are detected as a connected region. In this case, the number of connected regions is defined as the number of touches, and a representative point in each connected region is defined as a touch coordinate. As the representative point, for example, the centroid of each connected region may be used. Hereinbelow, a touch coordinate in a coordinate system of the acquirer 100 (a coordinate system of a range image) detected by the detector 210 is represented by $x_d^{(n)} = (x_d, y_d)^{(n)}$, where n denotes a number which is allocated to each touch coordinate when a plurality of touch coordinates are detected.

Figure 3:
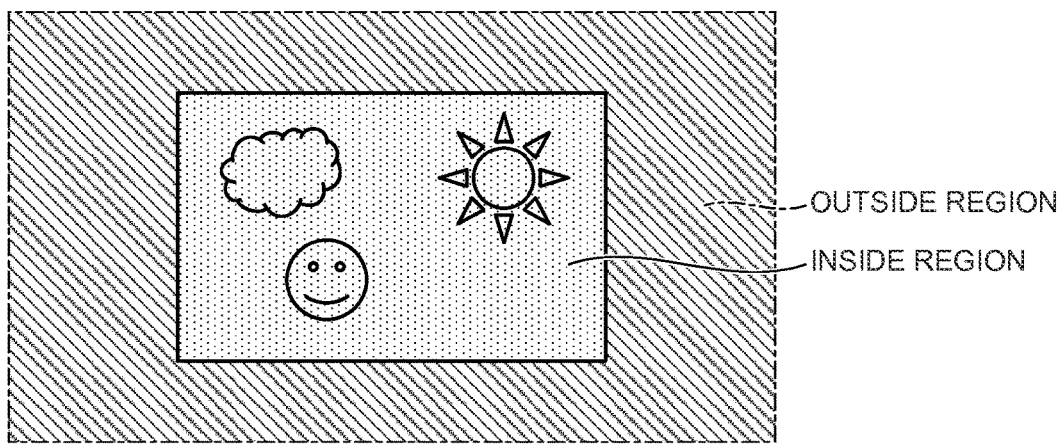
FIG. 3 is a schematic diagram illustrating an inside region and an outside region of the first embodiment.

Next, the determiner 220 will be described. The determiner 220 determines whether a touch coordinate detected by the detector 210 belongs to a first region which indicates a region including at least a part of the projection image on the projection plane or a second region which indicates a region including a smaller part of the projection image than the part of the projection image included in the first region on the projection plane. Herein, the first region is a region located inside the projection image, and the second region is a region located outside the projection image on the projection plane. However, the first and second regions are not limited to these regions. In the following description, the region located inside the projection image may be referred to as "inside region" and the region located outside the projection image may be referred to as "outside region". FIG. 3 is a schematic view illustrating the inside region and the outside region.

In the first embodiment, when a touch coordinate detected by the detector 210 is present in the inside region, the determiner 220 determines that the touch coordinate belongs to the inside region. On the other hand, when a touch coordinate is present in the outside region, the determiner 220 determines that the touch coordinate belongs to the outside region. As a method for determining whether a touch coordinate is present in the inside region or the outside region, condition determination for determining whether the touch coordinate falls within a predetermined range corresponding to a projection image in the coordinate system of the acquirer 100 may be performed. The range may be previously determined or dynamically determined. A region of a projection image is brighter than a peripheral region located outside the projection image. Thus, for example, the range may be determined by binarizing the brightness.

The determination may be performed by transforming the coordinate system of the acquirer 100 to the coordinate system of the projection image (the coordinate system of the input image). Herein, a coordinate in the coordinate system of the acquirer 100 is represented by $x_d = (x_d, y_d)$, and a coordinate in the coordinate system of the projection image is represented by $x_p = (x_p, y_p)$. In this case, whether the coordinate $x_p = (x_p, y_p)$ belongs to the inside region or the outside region may be determined using the following Equation (2).

$$\text{Region}(x_p, y_p) = \begin{cases} R_{inside} & (0 \leq x_p \leq W_p) \wedge (0 \leq y_p \leq H_p) \\ R_{outside} & \text{otherwise} \end{cases} \qquad (2)$$

In Equation (2), $W_p$ denotes the number of pixels in the horizontal direction of the input image, and $H_p$ denotes the number of pixels in the vertical direction of the input image. $R_{inside}$ and $R_{outside}$ denote values for managing which region each coordinate belongs to. For example, $R_{inside}=0$ and $R_{outside}=1$ indicate that the coordinate belongs to the outside region. On the other hand, $R_{inside}=1$ and $R_{outside}=0$ indicate that the coordinate belongs to the inside region. In this manner, values for managing which region each coordinate belongs to are previously set.

Figure 4:
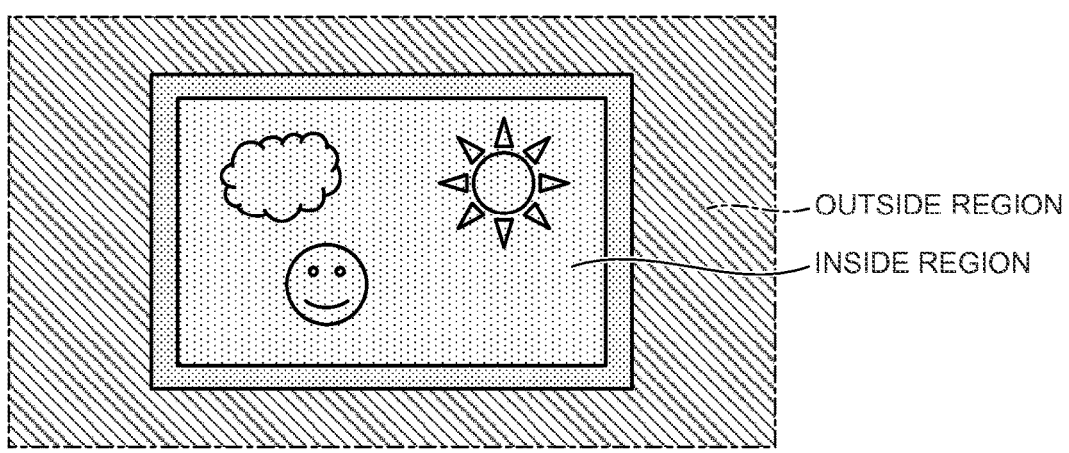
FIG. 4 is a diagram for describing a method for adjusting a boundary of inside/outside determination of the first embodiment.

Further, a boundary of inside/outside determination can be adjusted. For example, as illustrated in FIG. 4, a region determined as the inside region may be expanded to the outside of the projection image. This is effective, for example, when it is necessary to operate an icon displayed on the peripheral edge of the projection image. A determination condition when adjusting the boundary of the inside/outside determination can be represented, for example, by the following Equation (3).

$$\text{Region}(x_p, y_p) = \begin{cases} R_{inside} & (b_x \leq x_p < W_p - b_x) \wedge (b_y \leq y_p < H_p - b_y) \\ R_{outside} & \text{otherwise} \end{cases} \quad (3)$$

In Equation (3), $b_x$ and $b_y$ are adjustment parameters for inside/outside determination. For example, when each of $b_x$ and $b_y$ is set to 0, the boundary of inside/outside determination is the same as the boundary of the projection image. Changing the set value of each of $b_x$ and $b_y$ enables the boundary of inside/outside determination to be expanded toward the outside of the projection image or to be narrowed toward the inside of the projection image. For example, when $b_x=b_y=-10$ is satisfied, a region determined as the inside region can be expanded toward the outside of the projection image by 10 pixels.

Figure 5:
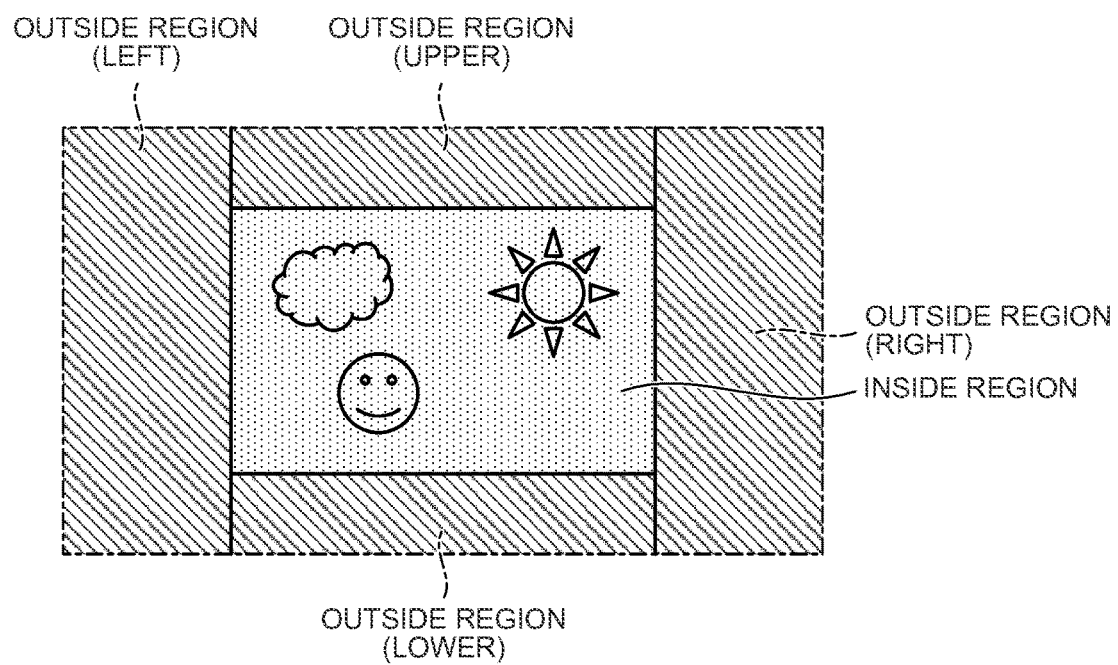
FIG. 5 is a diagram illustrating an example of variations of an operation region of the first embodiment.

Although two regions located inside and outside a projection image are defined in this example, the embodiment is not limited thereto. For example, as illustrated in FIG. 5, the five regions may be defined such as an inside region; an outside region located on the upper side of the inside region; an outside region located on the lower side of the inside region; an outside region located on the left side of the inside region; and an outside region located on the right side of the inside region. In this case, as many conditional expressions like Equation (3) as the regions may be defined so that Region $(x_p, y_p)$ can take multiple values. That is, it is only required that at least a first region which includes at least a part of the projection image on the projection plane and a second region which includes a smaller part of the projection image than the part of the projection image included in the first region on the projection plane are defined.

Here, an example of a method for transforming the coordinate system of the acquirer 100 to the coordinate system of the projection image will be described. In the following example, the coordinate transformation is performed using a projection model. The projection model transforms three-dimensional coordinates in a real space to two-dimensional coordinates in an image space, and can be applied to cameras (such as a visible light camera and an infrared camera), range image sensors (such as a depth sensor), and projectors. In this example, a projection model of the projector 400 is defined as the following Equation (4).

$$\lambda_p \tilde{x}_p = A_p [R_p | T_p] \tilde{X} \quad (4)$$

$\tilde{X} = (X_1, X_2, X_3, X_4)^T$    $\tilde{X}$ denotes homogenous coordinate of world coordinate system $\tilde{x}_p = (x_1, x_2, x_3)^T$    $\tilde{x}_p$ denotes Coordinate of projection image coordinate system Similarly, a projection model of the acquirer 100 is defined as the following Equation (5).

$$\lambda_d \tilde{x}_d = A_d [R_d | T_d] \tilde{X} \quad (5)$$

$\tilde{X} = (X_1, X_2, X_3, X_4)^T$    $\tilde{X}$ denotes homogenous coordinate of world coordinate system $\tilde{x}_d = (x_1, x_2, x_3)^T$    $\tilde{x}_d$ denotes Coordinate of acquire image coordinate system In Equation (4) and Equation (5), the three-dimensional coordinates (X, Y, Z) in a real space are derived in the form of $X=X_1/X_4$, $Y=X_2/X_4$, and $Z=X_3/X_4$. The two-dimensional coordinates (x, y) in the image space are derived in the form of $x=x_1/x_3$ and $y=x_2/x_3$. Further, a coefficient $\lambda$ denotes the uncertainty of constant multiplication, A denotes an internal parameter matrix determined by information such as focal length and resolution, and R and T denote external parameter matrices determined by the attitude of a camera or a projector. A, R, and T may be previously calculated by calibration. Further, each of A, R, and T denotes a vector. When the position of the acquirer 100 is defined as the origin of a world coordinate system, $R_d=I$ and $T_d=0$ can be satisfied, and the following Equation (6) can be obtained.

$$\begin{bmatrix} X \\ Y \\ Z \end{bmatrix} = A_d^{-1} \begin{bmatrix} x_d \cdot d(x_d, y_d) \\ y_d \cdot d(x_d, y_d) \\ d(x_d, y_d) \end{bmatrix} \quad (6)$$

Then, the following Equation (7) can be obtained by substituting the transformed world coordinates for the projection model of the projector 400.

$$\lambda_p \tilde{x}_p = A_p [R_p | T_p] \begin{bmatrix} A_d^{-1} \begin{bmatrix} x_d \cdot d(x_d, y_d) \\ y_d \cdot d(x_d, y_d) \\ d(x_d, y_d) \end{bmatrix} \\ 1 \end{bmatrix} \quad (7)$$

As described above, the touch coordinate $x_d^{(n)}=(x_d, y_d)^{(n)}$ represented by the coordinate system of the acquirer 100, which is detected by the detector 210, is substituted into the right side of Equation (7) so as to be transformed to the coordinate $x_p^{(n)}=(x_p, y_p)^{(n)}$ of the projection image. Although differing from the coordinate system used in the detection by the detector 210, the transformed touch coordinate $x_p^{(n)}=(x_p, y_p)^{(n)}$ also represents the position pointed by the pointing object.

A coordinate transformation method is not limited to the above method, and other known methods may be used. For example, the coordinate transformation may be performed by two-dimensional projective transformation (nomography transformation), or a coordinate transformation table may be previously calculated and held.

The determiner 220 supplies, to the controller 230, information (in the following description, may be referred to as "determination information") obtained by associating each of one or more touch coordinates detected by the detector 210 with region information indicating whether the touch coordinates belong to the inside region or the outside region. A coordinate system of the touch coordinates included in the determination information may be the coordinate system of the acquirer 100 or the coordinate system of the projection image transformed in the inside/outside determination.

Next, the controller 230 will be described. In the first embodiment, when a touch coordinate belongs to the inside region, the controller 230 performs control for executing first processing corresponding to an operation on the inside region based on the touch coordinate. On the other hand, when a touch coordinate belongs to the outside region, the controller 230 performs control for executing second processing corresponding to an operation on the outside region based on the touch coordinate. More details are as follows.

As illustrated in FIG. 1, the controller 230 is provided with a notification destination switcher 231, a first processing decider 232, and a second processing decider 233. The notification destination switcher 231 switches, in accordance with region information included in determination information received from the determiner 220, a notification destination of information that includes at least a touch coordinate included in the determination information to either the first processing decider 232 or the second processing decider 233. More specifically, when region information included in determination information indicates that a touch coordinate belongs to the inside region, the notification destination switcher 231 notifies the first processing decider 232 of information that includes at least the touch coordinate included in the determination information. The notification destination switcher 231 may notify the first processing decider 232 about the determination information received from the determiner 220 as it is. On the other hand, when region information included in determination information indicates that a touch coordinate belongs to the outside region, the notification destination switcher 231 notifies the second processing decider 233 about information that includes at least the touch coordinate included in the determination information. In the same manner as the above, the notification destination switcher 231 may notify the second processing decider 233 about the determination information received from the determiner 220 as it is.

Figure 6A:
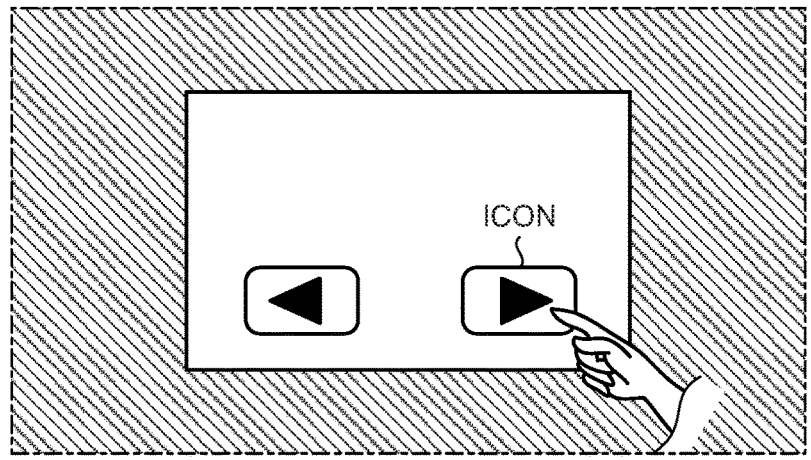
FIGS. 6A to 6C are diagrams illustrating examples of an operation determined by a first processing decider of the first embodiment.
Figure 6B:
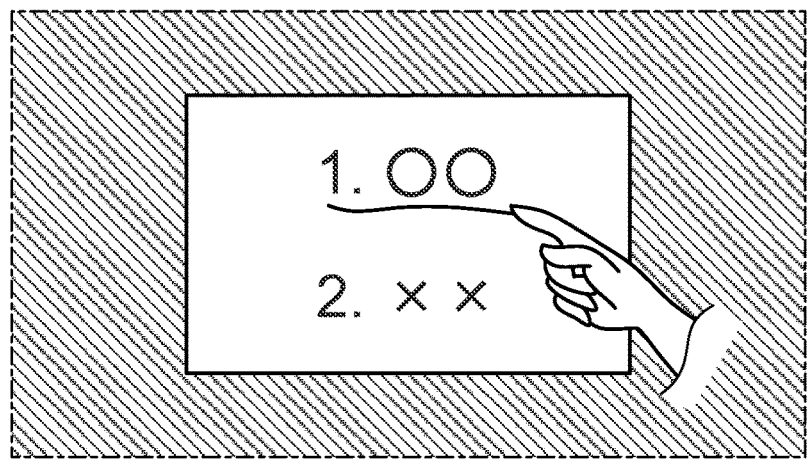
Figure 6C:
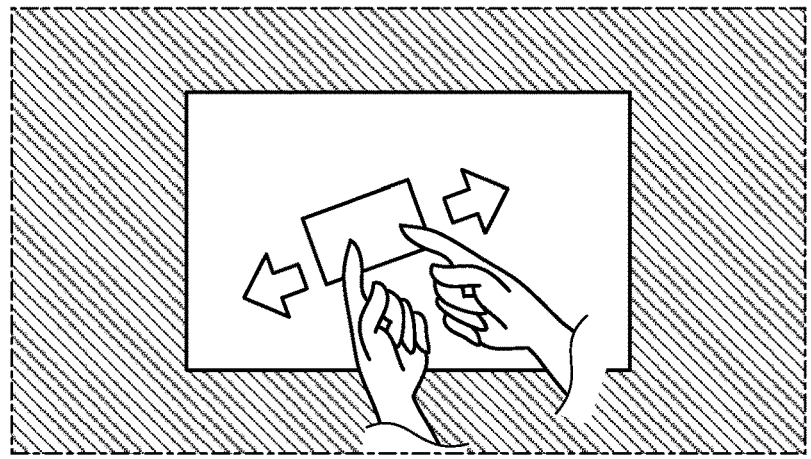

Next, the first processing decider 232 will be described. The first processing decider 232 determines an operation (operation on the inside region) performed by a pointing object on the basis of touch coordinates (touch coordinates belonging to the inside region) sequentially supplied (notified) from the notification destination switcher 231 and decides first processing corresponding to the determined operation. For example, on the basis of touch coordinates sequentially supplied from the notification destination switcher 231, the first processing decider 232 is capable of determining: a tap operation of releasing a pointing object (a finger of a use in this example) from the projection plane) after bringing the pointing object into the projection plane as illustrated in FIG. 6A; a drag operation of moving a pointing object in a state that the pointing object is brought close to the projection plane as illustrated in FIG. 6B; and a pinch operation (pinch out operation) of expanding the distance between two or more pointing objects in a state that the pointing object is brought close to the projection plane as illustrated in FIG. 6C. A method for determining these operations, various known techniques may be used. Then, the first processing decider 232 decides first processing corresponding to the determined operation. A method for deciding the first processing may be any method. For example, the first processing decider 232 may decide first processing corresponding to the determined operation as first processing to be executed with reference to table information in which a plurality of kinds of operations correspond one-to-one to a plurality of kinds of first processing. However, the method for determining the first processing corresponding to the determined operation is not limited to this method.

In this example, the first processing is processing to change at least a part of image information of an input image; however, the first processing is not limited thereto. In this example, the first processing corresponding to a tap operation may be processing for generating an image (or acquiring the image from an external device or an internal memory) that corresponds to an icon arranged at a position on the input image at which the tap operation is performed (the image differing from the input image before the tap operation is performed) as a next input image. However, the first processing is not limited to such processing.

After the first processing is decided in the above manner, the first processing decider 232 instructs the control device 300 to execute the decided first processing. In this example, the control performed by the first processing decider 232 described above corresponds to "control for executing first processing corresponding to an operation on the inside region based on a touch coordinate". Further, in this example, the control device 300 includes a first processor (not illustrated) which executes the first processing. The control device 300 executes the first processing in accordance with the instruction from the first processing decider 232 and controls, on the basis of a result of the first processing, the projector 400 which projects light including information of the input image onto the projection plane. For example, when the processing for generating an image that corresponds to an icon arranged at a position on the input image at which a tap operation has been performed as a next input image is executed as the first processing, the control device 300 may control the projector 400 to project the image obtained by the above first processing onto the projection plane.

In this example, the first processor which executes the first processing is mounted on the control device 300; however, the embodiment is not limited thereto. For example, the first processor may be provided inside the controller 230. For example, the first processor inside the controller 230 may transmit a result of the first processing (e.g., an image obtained by the first processing) to the control device 300, and the control device 300 may control the projector 400 on the basis of the transmitted result of the first processing.

Next, the second processing decider 233 will be described. The second processing decider 233 determines an operation (operation on the outside region) performed by a pointing object on the basis of touch coordinates (touch coordinates belonging to the outside region) sequentially supplied from the notification destination switcher 231 and decides second processing corresponding to the determined operation. For example, on the basis of touch coordinates sequentially supplied from the notification destination switcher 231, the second processing decider 233 is capable of detecting an operation of dragging the outside of the projection image as illustrated in FIG. 7. Then, the second processing decider 233 decides second processing corresponding to the determined operation. A method for deciding the second processing may be any method. For example, the second processing decider 233 may decide second processing corresponding to the determined operation as second processing to be executed with reference to table information in which a plurality of kinds of operations correspond one-to-one to a plurality of kinds of second processing. However, the method for deciding the second processing corresponding to the determined operation is not limited to this method.

The second processing differs from the first processing. In this example, the second processing is performed for changing the appearance of a projection image without changing image information of an input image. However, the second processing is not limited thereto. In the example illustrated in FIG. 7, as the second processing corresponding to a drag operation, processing for changing the brightness of the projection image is employed. This second processing converts the distance or the direction of the drag into the amount of control for increasing or reducing the brightness of the projection image.

After the second processing is determined in the above manner, the second processing decider 233 instructs the control device 300 to execute the decided second processing. In this example, the control performed by the second processing decider 233 described above corresponds to "control for executing second processing corresponding to an operation on the outside region based on a touch coordinate". Further, in this example, the control device 300 includes a second processor (not illustrated) which executes the second processing. The control device 300 executes the second processing in accordance with the instruction from the second processing decider 233 and controls the projector 400 on the basis of a result of the second processing. For example, when processing for converting the distance or the direction of dragging the outside of a projection image into the amount of control for increasing or reducing the brightness of the projection image is executed as the second processing, the control device 300 may control the projector 400 so that the projection image has a brightness corresponding to the control amount obtained by the second processing.

In this example, the second processor which executes the second processing is mounted on the control device 300; however, the embodiment is not limited thereto. For example, the second processor may be provided inside the controller 230. For example, the second processor inside the controller 230 may transmit a result of the second processing (e.g., the amount of control for increasing or reducing the brightness of a projection image) to the control device 300, and the control device 300 may control the projector 400 on the basis of the transmitted result of the second processing. Alternatively, for example, the second processor inside the controller 230 may transmit the result of the second processing to the projector 400. In this case, the projector 400 may control the brightness of the projection image on the basis of the transmitted result of the second processing.

Figure 8:
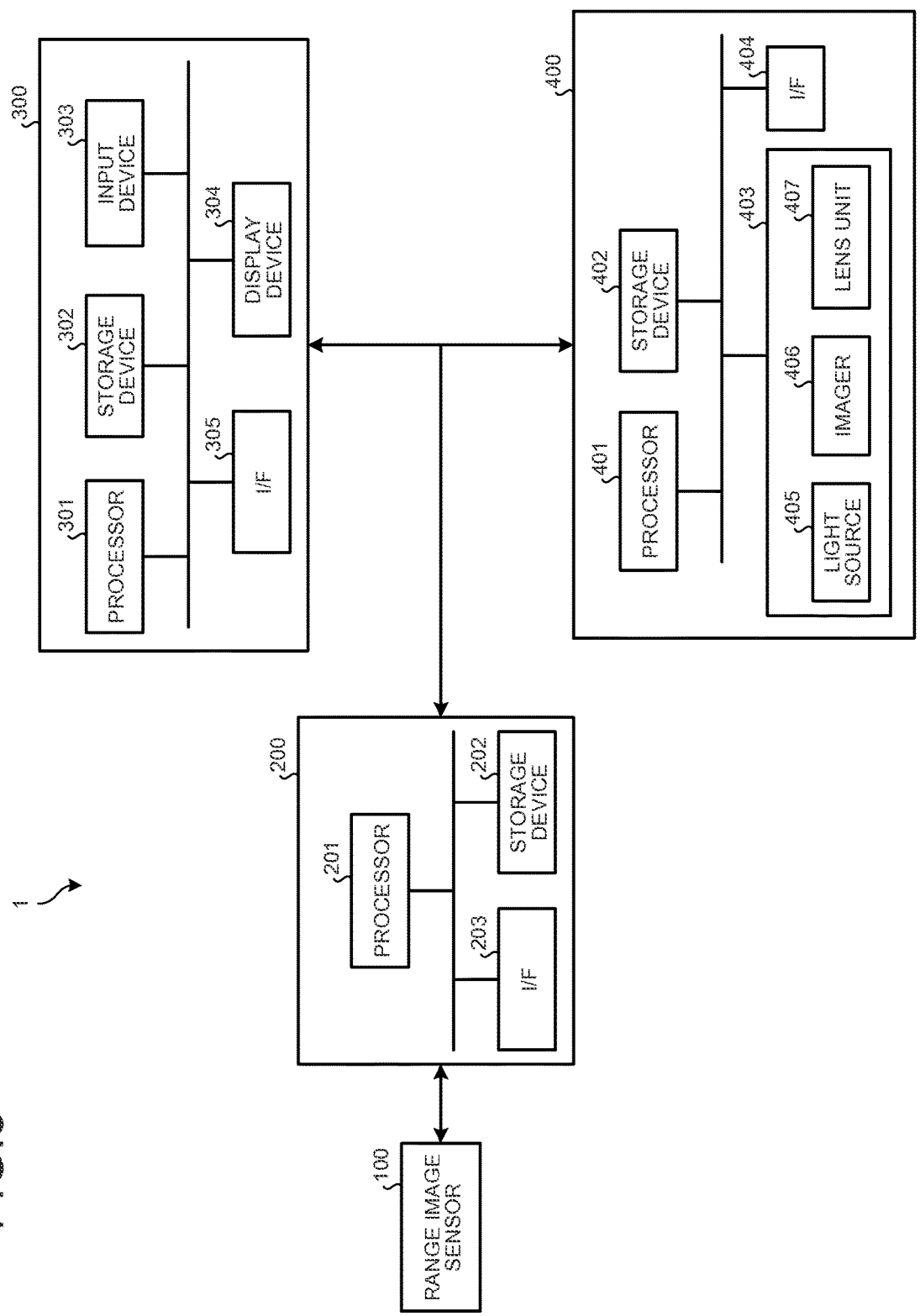
FIG. 8 is a diagram illustrating an example of the hardware configuration of the image projection apparatus of the first embodiment.

FIG. 8 is a diagram illustrating an example of the hardware configuration of the image projection apparatus 1 of the first embodiment. As illustrated in FIG. 8, the information processing device 200 is provided with a processor 201 which totally controls the operation of the information processing device 200, a storage device 202 such as ROM and RAM, and an I/F 203 for connection with other devices (the range image sensor 100, the control device 300, the projector 400, and the like). The functions of the above respective units (the detector 210, the determiner 220, and the controller 230 (the notification destination switcher 231, the first processing decider 232, and the second processing decider 233)) of the information processing device 200 may be achieved by executing programs stored in the storage device 202 by the processor 201. However, the embodiment is not limited thereto. For example, at least some of the functions of the respective units of the information processing device 200 may be achieved by a dedicated hardware circuit (e.g., a semiconductor integrated circuit).

As illustrated in FIG. 8, the control device 300 is provided with a processor 301 which totally controls the operation of the control device 300, a storage device 302 such as ROM and RAM, an input device 303 such as a keyboard and a mouse, a display device 304 which displays various pieces of information, and an I/F 305 for connection with other devices (the information processing device 200, the projector 400, and the like). The various functions of the control device 300 may be achieved by executing programs stored in the storage device 302 by the processor 301. However, the embodiment is not limited thereto. For example, at least some of the various functions of the control device 300 may be achieved by a dedicated hardware circuit (e.g., a semiconductor integrated circuit).

As illustrated in FIG. 8, the projector 400 is provided with a processor 401 which totally controls the operation of the projector 400, a storage device 402 such as ROM and RAM, a projection unit 403, and an I/F 404 for connection with other devices (the information processing device 200, the control device 300, and the like). In the example of FIG. 8, the projection unit 403 includes a light source 405, an imager 406, and a lens unit 407. Light emitted from the light source 405 is supplied to the imager 406. The imager 406 has a function of converting the light supplied from the light source 405 into light including information of an input image and outputting the converted light to the lens unit 407. The imager 406 includes, for example, a liquid crystal panel. The lens unit 407 projects the light output from the imager 406 onto the projection plane. The lens unit 407 includes, for example, a plurality of optical elements such as lenses, prisms, and mirrors. The various functions of the projector 400 may be achieved by executing programs stored in the storage device 402 by the processor 401. However, the embodiment is not limited thereto. For example, at least some of the various functions of the projector 400 may be achieved by a dedicated hardware circuit (e.g., a semiconductor integrated circuit).

Each program executed in the information processing device 200, the control device 300, and the projector 400 may be recorded in a computer-readable recording medium such as a compact disk read only memory (CD-ROM), a flexible disk (FD), a compact disk recordable (CD-R), and a digital versatile disk (DVD), and a universal serial bus (USB) as a file in an installable format or an executable format to be provided, or may be provided or distributed through a network such as the Internet. Further, each program executed in the information processing device 200, the control device 300, and the projector 400 may be provided by being previously incorporated in a nonvolatile recording medium such as ROM.

For example, the range image sensor 100, the information processing device 200, the control device 300, and the projector 400 may be configured as an integrated apparatus. Further, for example, the functions of the respective units of the information processing device 200 may be mounted on the projector 400. That is, the information processing device 200 and the projector 400 may be configured as an integrated apparatus. For example, the functions of the respective units of the information processing device 200 may be achieved by executing programs stored in the storage device 402 by the processor 401 of the projector 400. Further, for example, the functions of the respective units of the information processing device 200 may be mounted on the control device 300. That is, the information processing device 200 and the control device 300 may be configured as an integrated apparatus. For example, the functions of the respective units of the information processing device 200 may be achieved by executing programs stored in the storage device 302 by the processor 301 of the control device 300.

As described above, in the first embodiment, when a touch coordinate belongs to the inside region, control for executing first processing corresponding to an operation on the inside region based on the touch coordinate is performed. On the other hand, when a touch coordinate belongs to the outside region, control for executing second processing corresponding to an operation on the outside region based on the touch coordinate is performed. In other words, even in the same operation, processing (first processing) that is executed when the operation is performed in the inside region differs from processing (second processing) that is executed when the operation is performed in the outside region. Thus, regions located inside and outside a projection image can be provided to an operator (user) as operation regions for instructing execution of different kinds of processing. Therefore, the first embodiment is capable of providing more various operation systems to users than conventional techniques, and thus achieving an advantageous effect of improvement in convenience of users.

Modification 1 of First Embodiment

Figure 9:
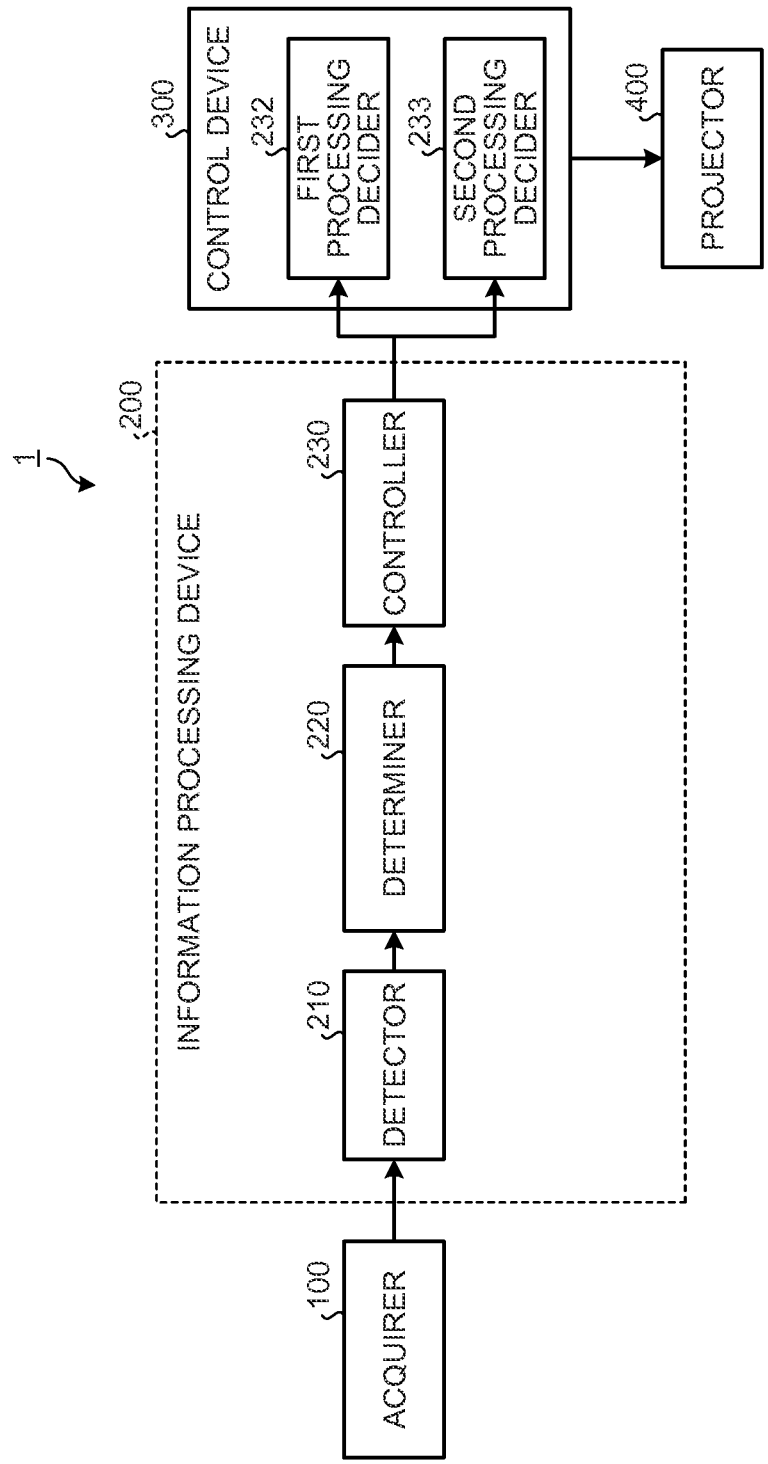
FIG. 9 is a diagram illustrating an example of the configuration of an image projection apparatus of a modification of the first embodiment.

For example, as illustrated in FIG. 9, the control device 300 may include the first processing decider 232 and the second processing decider 233. In this form, when a touch coordinate belongs to the inside region, the controller 230 performs control for notifying the first processing decider 232 inside the control device 300 about information including at least the touch coordinate. More specifically, when region information included in determination information received from the determiner 220 indicates that a touch coordinate belongs to the inside region, the controller 230 performs control for notifying the first processing decider 232 about information that includes at least the touch coordinate included in the determination information. For example, the controller 230 may perform control for notifying the first processing decider 232 about the determination information received from the determiner 220 as it is. In this example, the control performed by the controller 230 for notifying the first processing decider 232 about information that includes at least the touch coordinate corresponds to "control for executing first processing corresponding to an operation on the inside region based on the touch coordinate".

When a touch coordinate belongs to the outside region, the controller 230 performs control for notifying the second processing decider 233 inside the control device 300 about information including at least the touch coordinate. More specifically, when region information included in determination information received from the determiner 220 indicates that a touch coordinate belongs to the outside region, the controller 230 performs control for notifying the second processing decider 233 about information that includes at least the touch coordinate included in the determination information. For example, the controller 230 may perform control for notifying the second processing decider 233 about the determination information received from the determiner 220 as it is. In this example, the control performed by the controller 230 for notifying the second processing decider 233 about information that includes at least the touch coordinate corresponds to "control for executing second processing corresponding to an operation on the outside region based on the touch coordinate".

Further, not limited to the example of FIG. 9, for example, only either one of the first and second processing deciders 232 and 233 may be provided in the control device 300, and the other one may be provided in the controller 230 in the same manner as in the first embodiment.

Modification 2 of First Embodiment

For example, when both a touch coordinate belonging to the inside region and a touch coordinate belonging to the outside region are present, the controller 230 may reject the touch coordinate belonging to the inside region or reject the touch coordinate belonging to the outside region. For example, when the controller 230 simultaneously receives a piece of determination information that includes region information indicating that a touch coordinate belongs to the inside region and a piece of determination information that includes region information indicating that a touch coordinate belongs to the outside region from the determiner 220, the controller 230 may reject either one piece of the determination information in accordance with a predetermined condition. For example, when the condition defines that, when both a touch coordinate belonging to the inside region and a touch coordinate belonging to the outside region are present, the touch coordinate belonging to the inside region is rejected, the controller 230 rejects the piece of determination information that includes region information indicating that the touch coordinate belongs to the inside region from the pieces of determination information simultaneously received from the determiner 220. On the other hand, when the condition defines that, when both a touch coordinate belonging to the inside region and a touch coordinate belonging to the outside region are present, the touch coordinate belonging to the outside region is rejected, the controller 230 rejects the piece of determination information that includes region information indicating that the touch coordinate belongs to the outside region from the pieces of determination information simultaneously received from the determiner 220.

For example, when both a touch coordinate belonging to the inside region and a touch coordinate belonging to the outside region are present, the controller 230 may perform control for executing third processing that corresponds to an operation performed across both the inside region and the outside region. In this case, for example, the controller 230 may be provided with a third processing decider which determines an operation on the basis of one or more touch coordinates belonging to each of the inside and outside regions and decides third processing corresponding to the determined operation. In this form, when the notification destination switcher 231 simultaneously receives a piece of determination information that includes region information indicating that a touch coordinate belongs to the inside region and a piece of determination information that includes region information indicating that a touch coordinate belongs to the outside region from the determiner 220, the notification destination switcher 231 may notify the third processing decider about information that includes at least the touch coordinate included in each of the simultaneously received two or more pieces of determination information. For example, the notification destination switcher 231 may notify the third processing decider about the simultaneously received two or more pieces of determination information as they are.

Second Embodiment

Next, a second embodiment will be described. In the second embodiment, the second processing described above includes processing for changing the shape of a projection image. Examples of the processing for changing the shape of a projection image include processing for enlarging or reducing the projection image, processing for rotating the projection image, and processing for moving the projection image. In the second embodiment, a determiner 220 changes conditions for determining whether a touch coordinate detected by a detector 210 belongs to an inside region or an outside region in response to a change in the shape of the projection image. Hereinbelow, details will be described. Description of common points between the second embodiment and the first embodiment will be appropriately omitted.

Figure 10:
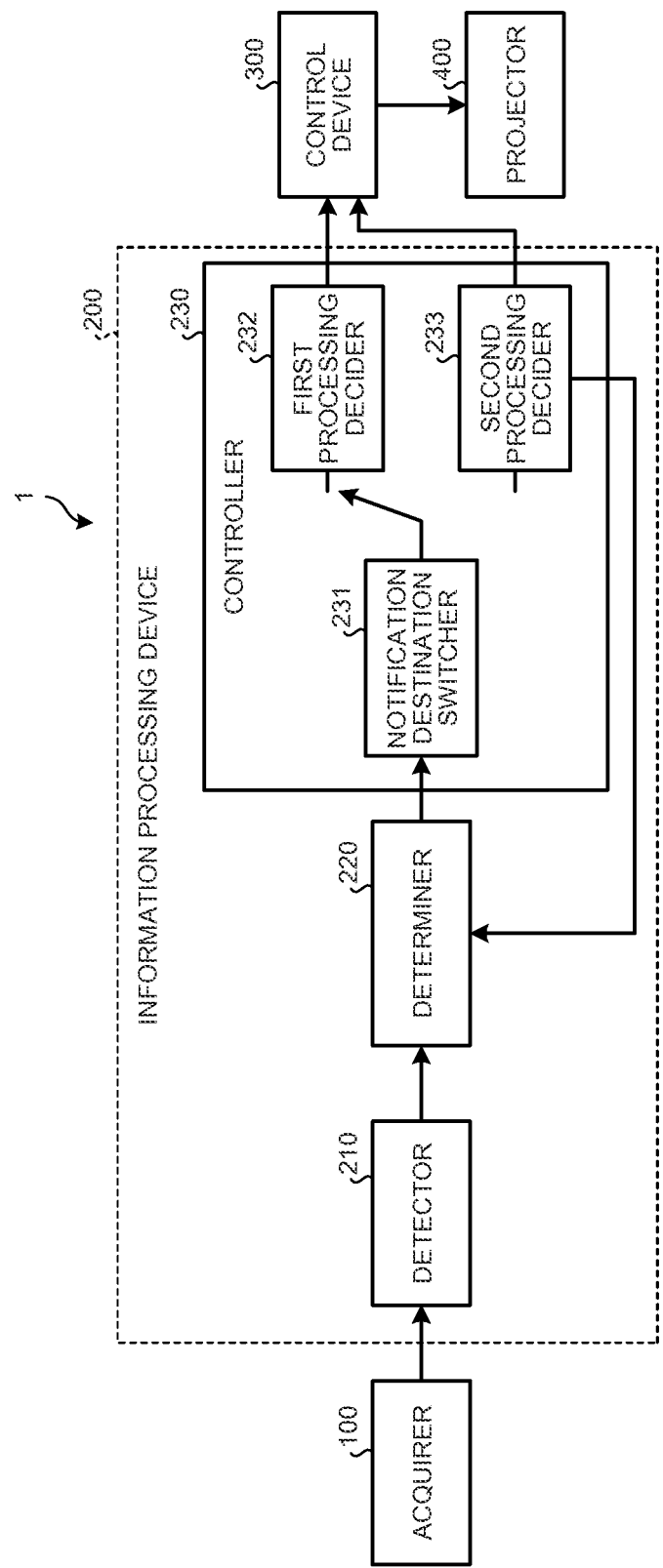
FIG. 10 is a diagram illustrating an example of the configuration of an image projection apparatus of a second embodiment.
Figure 11A:
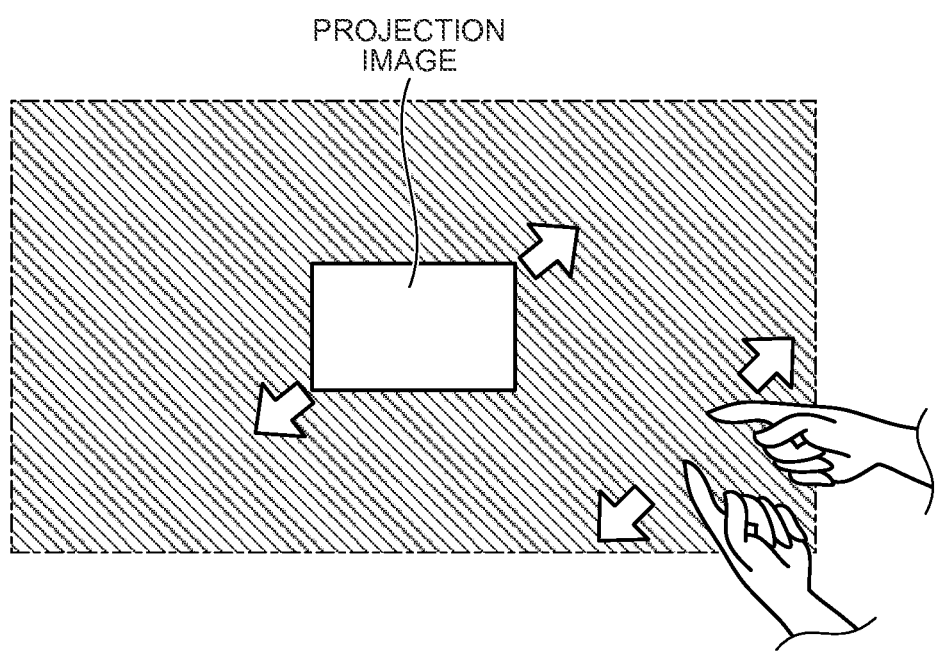
FIGS. 11A and 11B are diagrams illustrating an example of an operation determined by a second processing decider of the second embodiment.
Figure 11B:
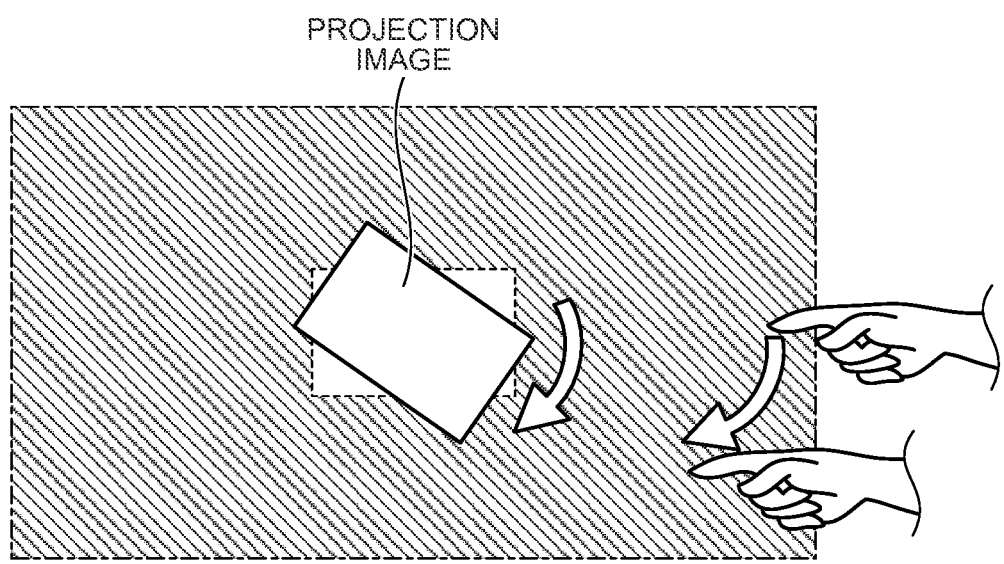

FIG. 10 is a diagram illustrating an example of the configuration of an image projection apparatus 1 of the second embodiment. As described in the first embodiment, a second processing decider 233 determines an operation performed by a pointing object on the basis of touch coordinates (touch coordinates belonging to the outside region) sequentially supplied from a notification destination switcher 231 and decides second processing corresponding to the determined operation. In this example, as second processing corresponding to a pinch operation as illustrated in FIG. 11A, the second processing decider 233 decides processing for converting an increase or decrease in the distance between two touch coordinates into the enlargement ratio of a projection image (processing for enlarging or reducing the projection image). Further, as second processing corresponding to a drag operation as illustrated in FIG. 11B, the second processing decider 233 decides processing for converting the movement distance of a touch coordinate into the amount of an increase or decrease in the rotation angle of a projection image (processing for rotating the projection image). Then, the second processing decider 233 notifies the determiner 220 about information that can specify the change in the shape of the projection image. Upon receiving the notification, the determiner 220 changes (updates) conditions for inside/outside determination in response to the change in the shape of the projection image.

Figure 12:
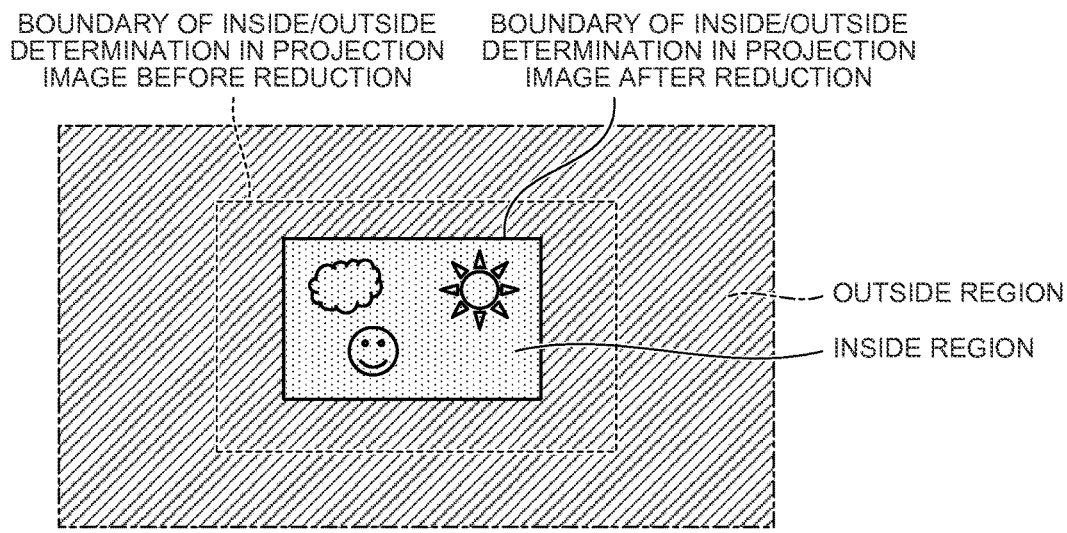
FIG. 12 is a diagram illustrating a case in which a boundary of inside/outside determination in a projection image of the second embodiment changes.
Figure 13:
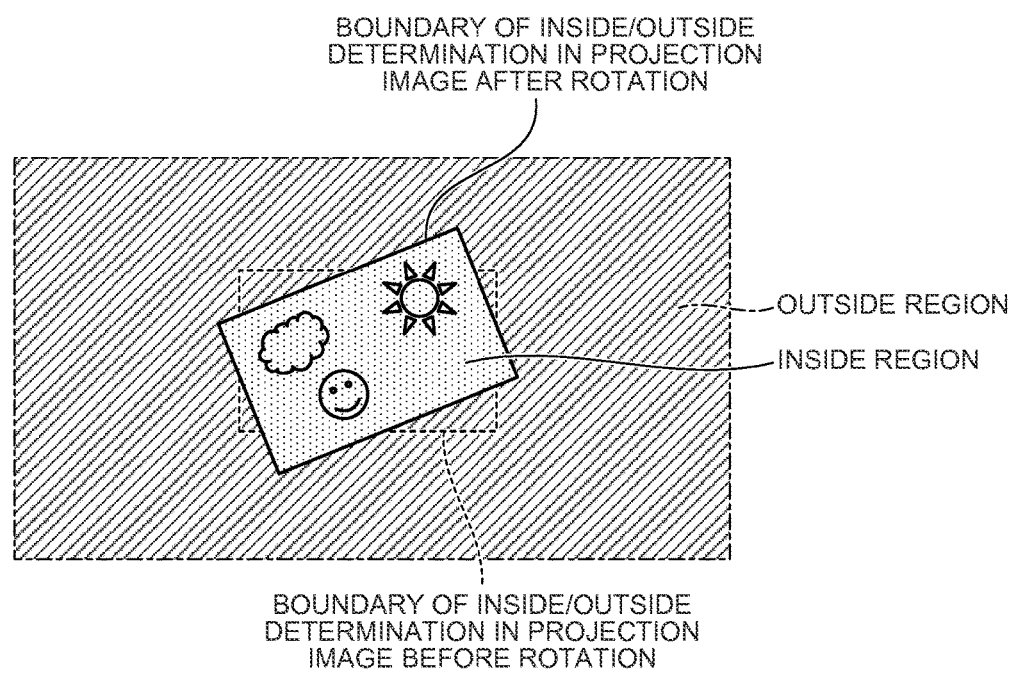
FIG. 13 is a diagram illustrating a case in which a boundary of inside/outside determination in a projection image of the second embodiment changes.

For example, as illustrated in FIG. 12, when a projection image is reduced, the boundary of inside/outside determination of the projection image also changes. Thus, in order to perform enlargement or reduction in response to the pinch operation as illustrated in FIG. 11A, the range of inside/outside determination may be enlarged or reduced in the same manner. Further, for example, also when a projection image is rotated as illustrated in FIG. 13, the boundary of inside/outside determination of the projection image changes. Thus, in order to perform rotation in response to the drag operation as illustrated in FIG. 11B, the range of inside/outside determination may be rotated in the same manner.

In this example, when a second processor (e.g., a control device 300) which executes the second processing executes processing for changing the shape of a projection image as the second processing, the second processor performs control for changing the shape of an input image (without changing image information of the input image) to thereby change the shape of the projection image. However, the embodiment is not limited thereto. For example, when a lens unit 407 of a projector 400 is composed of a zoom lens capable of changing the angle of view and processing for enlarging or reducing a projection image is executed as the second processing, the second processor may control the lens unit 407 (zoom lens) so as to obtain a desired enlargement ratio.

When the projection image whose shape has been changed is considered as a projection image projected from a virtual projection unit (virtual projector) which has any internal parameter (internal parameter matrix determined on the basis of information such as focal length and resolution) and any external parameter (external parameter matrix determined on the basis of the attitude of a camera or a projector, such as translation and rotation) and the inside/outside determination is performed by coordinate transformation using the projection model described above, calculation is made easy. For example, a projection image that has been deformed in such a manner that the size in each of the vertical and horizontal directions becomes half the initial size can be considered as a projection image projected from a virtual projector that has a half angle of view in each of the vertical and horizontal directions. Similarly, a projection image that has been rotated by 45° can be considered as a projection image projected from a virtual projector rotated by 45°. An internal parameter of the virtual projector is denoted by $A_{p'}$ and external parameters thereof are denoted by $R_{p'}$ and $T_{p'}$. Further, each of $A_{p'}$, $R_{p'}$, and $T_{p'}$ denotes a vector. The coordinate transformation to the projection image whose shape has been changed can be represented by the following Equation (8).

$$\lambda_{p'} \tilde{x}_{p'} = A_{p'} [R_{p'} | T_{p'}] \left[ A_d^{-1} \begin{bmatrix} x_d \cdot d(x_d, y_d) \\ y_d \cdot d(x_d, y_d) \\ d(x_d, y_d) \\ 1 \end{bmatrix} \right] \quad (8)$$

From the above, the inside or outside of the projection image whose shape has been changed can be determined by the following Equation (9).

$$\text{Region}(x_{p'}, y_{p'}) = \quad (9)$$
$$\begin{cases} R_{inside} & (b_x \leq x_{p'} < W_p - b_x) \wedge (b_y \leq y_{p'} < H_p - b_y) \\ R_{outside} & \text{otherwise} \end{cases}$$

Third Embodiment

Next, a third embodiment will be described. In the third embodiment, a determiner 220 determines whether a current touch coordinate belongs to an inside region or an outside region on the basis of the continuity between a past touch coordinate and the current touch coordinate. Hereinbelow, details will be described. Description of common points between the third embodiment and the first embodiment will be appropriately omitted.

Figure 14:
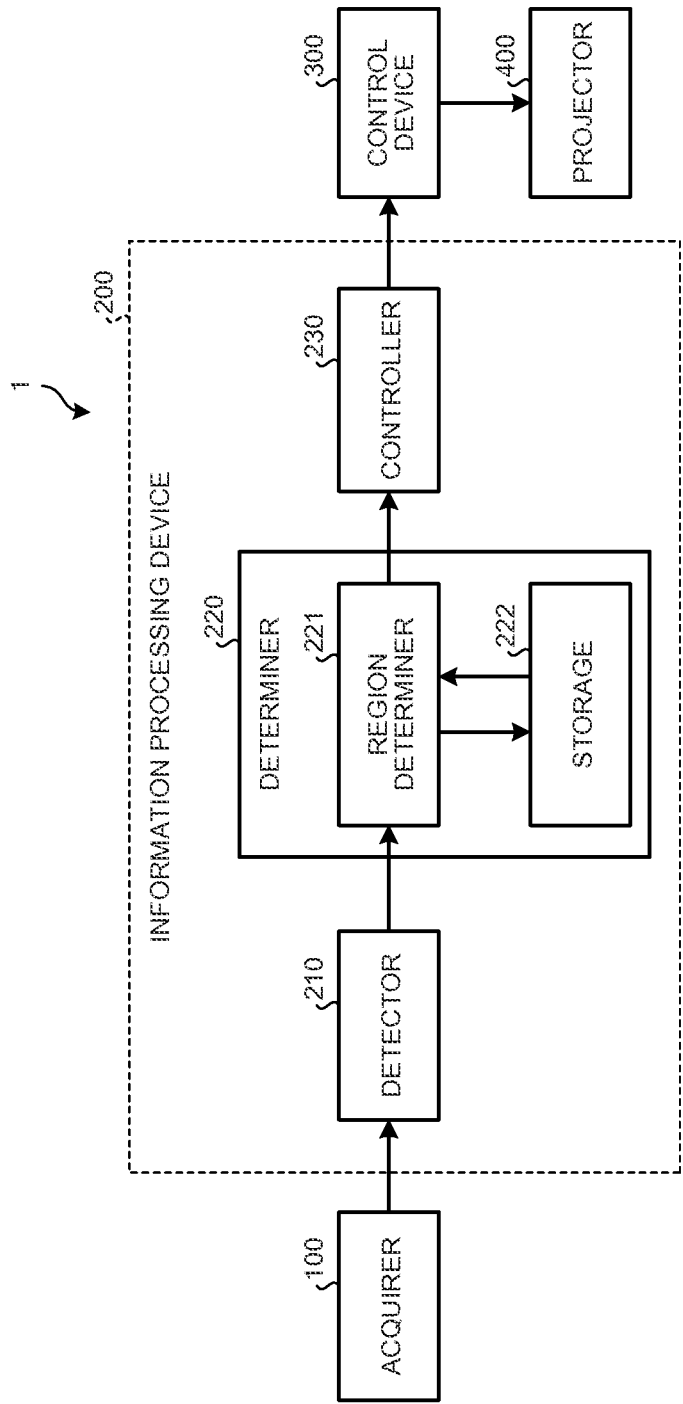
FIG. 14 is a diagram illustrating an example of the configuration of an image projection apparatus of a third embodiment.

FIG. 14 is a diagram illustrating an example of the configuration of an image projection apparatus 1 of the third embodiment. As illustrated in FIG. 14, a determiner 220 is provided with a region determiner 221 and a storage 222. The storage 222 stores therein a past touch coordinate. More specifically, the storage 222 stores therein each piece of past determination information (information obtained by associating a touch coordinate with region information indicating whether the touch coordinate belongs to the inside region or the outside region) in association with time information (e.g., information indicating time when the touch coordinate is received from a detector 210).

The region determiner 221 determines whether the current touch coordinate (the latest touch coordinate detected by the detector 210) belongs to the inside region or the outside region on the basis of the continuity between the past touch coordinate stored in the storage 222 and the current touch coordinate. More specifically, when the distance between the current touch coordinate and a past touch coordinate, which is detected earlier by a predetermined time than a point of time when the current touch coordinate is detected (a point of time when the latest touch coordinate is received from the detector 210), is equal to or less than a threshold, the region determiner 221 determines that the past touch coordinate and the current touch coordinate are continuous with each other. In the third embodiment, upon receiving the latest touch coordinate from the detector 210, the region determiner 221 specifies one or more pieces of determination information earlier by a predetermined time than a point of time when the latest touch coordinate is received from the detector 220 with reference to the storage 222. Then, when there is a piece of determination information that includes a touch coordinate having a distance equal to or less than the threshold from the latest touch coordinate in the specified one or more pieces of determination information, the region determiner 221 determines that the touch coordinate (past touch coordinate) included in the piece of determination information and the latest touch coordinate (current touch coordinate) are continuous with each other.

Figure 15:
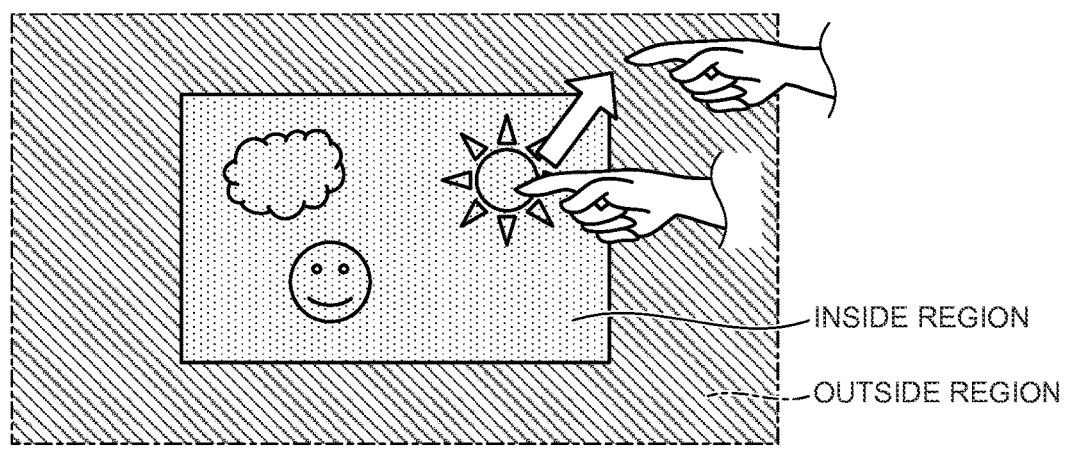
FIG. 15 is a diagram for describing an effect of the third embodiment.

When the past touch coordinate and the current touch coordinate have been determined to be continuous with each other and the past coordinate belongs to the inside region, the region determiner 221 determines that the current touch coordinate belongs to the inside region even if the current touch coordinate is present in the outside region. Then, the region determiner 221 stores determination information obtained by associating the current touch coordinate with region information indicating that the current touch coordinate belongs to the inside region in the storage 222 and supplies the determination information to a controller 230. Accordingly, for example, as illustrated in FIG. 15, even if a hand of a user (pointing object) performing a drag operation enters the outside region during executing first processing corresponding to a drag operation in the inside region (e.g., processing for moving an icon), the touch coordinate is determined to belong to the inside region. Thus, the first processing is not switched to second processing corresponding to a drag operation in the outside region (e.g., processing for rotating the projection image) immediately after the hand of the user performing the drag operation enters the outside region, and the first processing corresponding to the drag operation can be continued in the inside region. Therefore, an unexpected operation for the user can be prevented.

Similarly, when the past touch coordinate and the current touch coordinate have been determined to be continuous with each other and the past coordinate belongs to the outside region, the region determiner 221 determines that the current touch coordinate belongs to the outside region even if the current touch coordinate is present in the inside region. Then, the region determiner 221 stores determination information obtained by associating the current touch coordinate with region information indicating that the current touch coordinate belongs to the outside region in the storage 222 and supplies the determination information to the controller 230.

Further, in this example, when the storage 222 receives no touch coordinate from the detector 210 for a predetermined period of time (that is, when no touch coordinate is detected for a predetermined period of time), the storage 222 erases past determination information stored therein. Accordingly, the inside/outside determination for a newly detected touch coordinate is performed without taking the past determination information into consideration.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The above embodiments and the modifications may be combined in any manner.

What is claimed is:

1. An information processing device comprising:
a detector configured to detect a pointed-to position, pointed to by a pointing object, on a projection object onto which light including information of an input image is projected; and
processing circuitry configured to
when the pointed-to position belongs to a first region, perform control for executing first processing corresponding to an operation on the first region based on the pointed-to position, the first region being a part of a projection region of the projection object, the projection region being a region onto which the light including the information of the input image is projected, and
when the pointed-to position belongs to a second region, perform control for executing second processing corresponding to an operation on the second region based on the pointed-to position, the second region being in the projection region and being less bright than the first region, wherein
the first processing comprises processing for displaying a projection image formed by projecting, onto the projection object, light including information of an image that is different from the input image, and
the second processing comprises processing for changing a shape of the projection image formed by projecting, onto the projection object, the light including the information of the input image.

2. The device according to claim 1, wherein
the second region is located outside the first region.

3. The device according to claim 1, wherein the processing circuitry is configured to determine an operation on the basis of the pointed-to position belonging to the first region and decide the displaying of the projection image formed by projecting onto the projection object the light including the information of the image that is different from the input image as the first processing corresponding to the determined operation.

4. The device according to claim 3, wherein the processing circuitry is configured to instruct a processor that executes the first processing to execute the determined operation.

5. The device according to claim 1, wherein the processing circuitry is configured to determine an operation on the basis of the pointed-to position belonging to the second region and decide the second processing corresponding to the determined operation.

6. The device according to claim 5, wherein the processing circuitry is configured to instruct a processor that executes the second processing to execute the determined operation.

7. The device according to claim 1, wherein the processing circuitry is configured to, when both the pointed-to position belonging to the first region and the pointed-to position belonging to the second region are present, reject the pointed-to position belonging to the first region.

8. The device according to claim 1, wherein the processing circuitry is configured to, when both the pointed-to position belonging to the first region and the pointed-to position belonging to the second region are present, reject the pointed-to position belonging to the second region.

9. The device according to claim 1, wherein the processing circuitry is configured to, when both the pointed-to position belonging to the first region and the pointed-to position belonging to the second region are present, perform control for executing third processing corresponding to an operation performed across both the first region and the second region.

10. The device according to claim 1, wherein the processing circuitry is configured to determine whether the pointed-to position belongs to the first region or the second region, and wherein
the processing circuitry is configured to change conditions for determining whether the pointed-to position belongs to the first region or the second region in response to a change in the shape of the projection image.

11. The device according to claim 1, wherein the processing circuitry is configured determine whether the pointed-to position belongs to the first region or the second region, and wherein
the processing circuitry is configured to determine, on the basis of continuity between a past pointed-to position and a current pointed-to position, whether the current pointed-to position belongs to the first region or the second region.

12. The device according to claim 11, wherein the processing circuitry is configured to, when a distance between the current pointed-to position and a past pointed-to position, which is detected earlier by a predetermined time than a point of time when the current pointed-to position is detected, is equal to or less than a threshold, determine that the past pointed-to position and the current pointed-to position are continuous with each other.

13. The device according to claim 12, wherein the processing circuitry is configured to determine, when the past pointed-to position and the current pointed-to position have been determined to be continuous with each other and the past pointed-to position belongs to the first region, that the current pointed-to position belongs to the first region even when the current pointed-to position is present in the second region.

14. The device according to claim 12, wherein the processing circuitry is configured to determine, when the past pointed-to position and the current pointed-to position have been determined to be continuous with each other and the past pointed-to position belongs to the second region, that the current pointed-to position belongs to the second region even when the current pointed-to position is present in the first region.

15. An image projection apparatus comprising:
the information processing device according to claim 1; and
a projector to project the light including the information of the input image onto the projection object.

16. The device according to claim 1, wherein the second processing further comprises processing for changing brightness of a projection image formed by projecting onto the projection object the light including the information of the input image.

17. An information processing method comprising:
detecting a pointed-to position pointed-to by a pointing object on a projection object onto which light including information of an input image is projected; and
performing, when the pointed-to position belongs to a first region, control for executing first processing corresponding to an operation on the first region based on the pointed-to position, the first region being a part of a projection region of the projection object, the projection region being a region onto which the light including the information of the input image is projected, and performing, when the pointed-to position belongs to a second region, control for executing second processing corresponding to an operation on the second region based on the pointed-to position, the second region being in the projection region and being less bright than the first region, wherein
the first processing is processing for displaying a projection image formed by projecting onto the projection object light including information of an image that is different from the input image, and
the second processing is processing for changing a shape of the projection image formed by projecting, onto the projection object, the light including the information of the input image.

* * * * *